(12) United States Patent
Jain et al.

(10) Patent No.: US 10,949,172 B1
(45) Date of Patent: Mar. 16, 2021

(54) SYSTEM, METHOD, AND COMPUTER PROGRAM FOR DETERMINING INCREMENTAL CODE COVERAGE OF A SOFTWARE PROJECT

(71) Applicant: Amdocs Development Limited, Limassol (CY)

(72) Inventors: Swatantra Jain, Jabalpur (IN); Ankit Nevatia, Pune (IN); Dhruv Upadhyaya, Jaipur (IN)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 16/163,458

(22) Filed: Oct. 17, 2018

Related U.S. Application Data

(60) Provisional application No. 62/586,030, filed on Nov. 14, 2017.

(51) Int. Cl.
*G06F 9/44* (2018.01)
*G06F 8/38* (2018.01)
*G06F 11/36* (2006.01)
*G06F 8/20* (2018.01)

(52) U.S. Cl.
CPC .................. *G06F 8/38* (2013.01); *G06F 8/20* (2013.01); *G06F 11/3676* (2013.01)

(58) Field of Classification Search
CPC ........... G06F 8/20; G06F 8/38; G06F 11/3676
USPC .................. 717/101, 110–113, 124–125, 131
See application file for complete search history.

(56) References Cited

U.S. PATENT DOCUMENTS

| | | | |
|---|---|---|---|
| 6,536,036 B1 | 3/2003 | Pavela | |
| 8,561,036 B1 * | 10/2013 | Beans | G06F 11/368 |
| | | | 717/124 |
| 2010/0146340 A1 | 6/2010 | Bhate et al. | |
| 2016/0299835 A1 | 10/2016 | Jain et al. | |
| 2016/0328314 A1 | 11/2016 | Yadava et al. | |
| 2017/0132121 A1 | 5/2017 | Cooper et al. | |

OTHER PUBLICATIONS

SciTools, "Understand Source Code Analysis & Metrics—User Guide and Reference Manual", Version 2.0, Mar. 2008, Scientific Toolworks, Inc., 266 pages (Year: 2008).*
Atlassian Documentation, "About Code Coverage", Jun. 2017, retrieved from https://confluence.atlassian.com/clover/about-code-coverage-71599496.html , 3 pages (Year: 2017).*

(Continued)

*Primary Examiner* — Ted T. Vo
(74) *Attorney, Agent, or Firm* — Zilka-Kotab, P.C.

(57) ABSTRACT

A system, method, and computer program product are provided for determining incremental code coverage of a software project. In operation, a system provides computation of project specific incremental (delta) code coverage in parallel in scenarios of multiple project teams working on different projects on a same module (or in the same repository). Further, an incremental code/mutation coverage analyzer engine associated with the system may be integrated with a project management tool and a version control software to obtain the changed code lines with respect to each project, using what it calculates as the incremental code and/or the mutation coverage.

7 Claims, 14 Drawing Sheets

(56) References Cited

OTHER PUBLICATIONS

Alexander Todorov, "Mutation Testing vs. Coverage", 2016, retreived from http://atodorov.org/blog/2016/12/27/mutation-testing-vs-coverage/ , 11 pages (Year: 2016).*
Tasktop, "Incremental code coverage as a debugging tool", 2012, Tasktop Blog, retrieved from https://www.tasktop.com/blog/incremental-code-coverage-debugging-tool/ , 5 pages. (Year: 2012).*
Eder et al., "Did We Test Our Changes? Assessing Alignment between Tests and Development in Practice," CQSE, 2013, 4 pages, retrieved from https://www.cqse.eu/publications/2013-did-we-test-our-changes-assessing-alignment-between-tests-and-development-in-practice.pdf.
Campbell, G., "Differentials: Four ways to see what's changed," sonarsource Blog, Jun. 12, 2013, 3 pages, retrieved from https://blog.sonarsource.com/differentials-four-ways-to-see-whats-changed/.
Cachia et al., "Towards Incremental Mutation Testing," Electronic Notes in Theoretical Computer Science, 2013, pp. 1-12, retrieved from https://www.um.edu.mt/_data/assets/pdf_file/0003/176295/submitted.pdf.

\* cited by examiner

900

US 10,949,172 B1

SYSTEM, METHOD, AND COMPUTER PROGRAM FOR DETERMINING INCREMENTAL CODE COVERAGE OF A SOFTWARE PROJECT

CLAIM OF PRIORITY AND RELATED APPLICATIONS

This application claims the benefit of U.S. Provisional Application No. 62/586,030, filed Nov. 14, 2017, the entire contents of which are incorporated herein by reference.

FIELD OF THE INVENTION

The present invention relates to software development and testing and, more particularly to, the determination of the incremental code coverage and/or incremental mutation coverage for individual software projects or teams within a common working environment.

BACKGROUND

In computer software, code coverage refers to a measure used to describe the degree to which the source code of a program is tested by a particular test suite. A program with high code coverage is thoroughly tested and has a lower chance of containing the software bugs than a program with low code coverage. The most important aspect of code quality maintenance is to test the runtime behavior of application logic on a day to day basis. However, in a typical product development and maintenance environment, new software projects often involve dealing with enormously complex legacy code along with new development.

With the growing demand of updating the existing codes with constantly changing customer requirements and having a need for the frequent releases, determination of incremental code coverage is vital for software development organizations. Incremental code coverage gives information about the code coverage only for the portion of codes that are changed instead of giving information about the code coverage for the entire source code. Existing systems fail to provide incremental code coverage per project.

There is thus a need for addressing these and/or other issues associated with the prior art.

SUMMARY

A system, method, and computer program product are provided for determining incremental code coverage of a software project. In operation, a system provides computation of project specific incremental (delta) code coverage in parallel in scenarios of multiple project teams working on different projects on a same module (or in the same repository). Further, an incremental code/mutation coverage analyzer engine associated with the system may be integrated with a project management tool and a version control software to obtain the changed code lines with respect to each project, using what it calculates as the incremental code and/or the mutation coverage.

DETAILED DESCRIPTION

Figure 1:
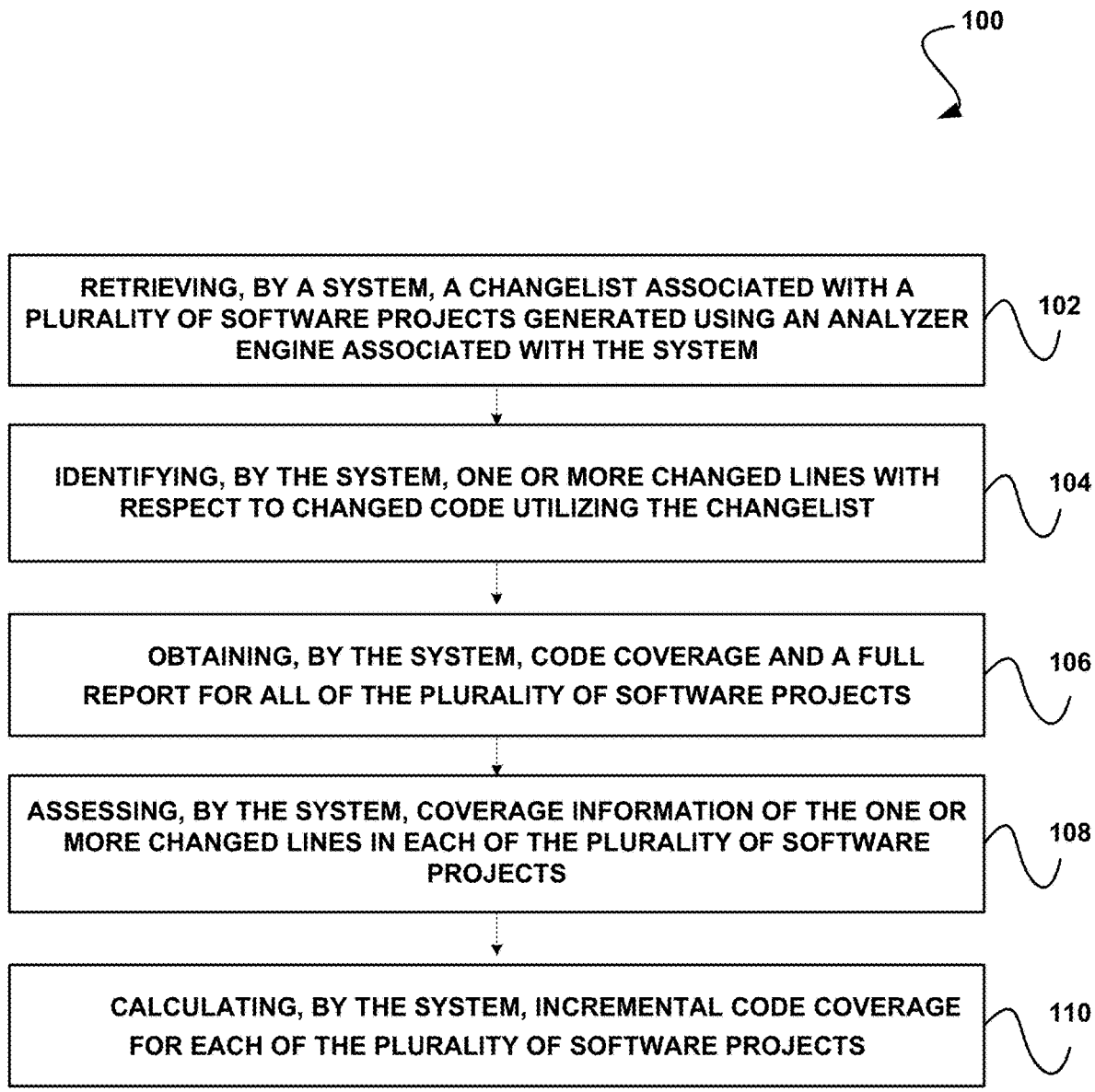
FIG. 1 illustrates a method for determining incremental code coverage of a software project, in accordance with one embodiment.

FIG. 1 illustrates a method 100 for determining incremental code coverage of a software project, in accordance with one embodiment.

In operation, a system retrieves a changelist associated with a plurality of software projects generated using an analyzer engine associated with the system. See operation 102. The changelist may include any information associated with any change to the software projects. For example, the changelist may include information about code portions that are changed in existing codes for each of the plurality of software projects. Additionally, the changelist may include broad level information about specific portions or sub-modules that are currently being changed by respective project teams.

The system identifies one or more changed lines with respect to changed code utilizing the changelist. See operation 104. The system obtains code coverage and a full report for all of the plurality of software projects. See operation 106. The system assesses coverage information of the one or more changed lines in each of the plurality of software projects. See operation 108. Moreover, the system calculates incremental code coverage for each of the plurality of software projects. See operation 110.

In one embodiment, the system may perform a lexical analysis of code portions that are changed to identify names of test cases that were added specifically as part of a particular project. In this case, the system may determine a result of the test cases. Determining the result of the test cases may include determining whether the test cases passed or failed in a latest build execution.

The system described herein provides computation of project specific incremental (delta) code coverage in parallel in scenarios of multiple project teams working on different projects on a same module (or in the same repository). Further, an incremental code/mutation coverage analyzer engine associated with the system may be integrated with a project management tool and a version control software to obtain the changed code lines with respect to each project, using what it calculates as the incremental code and/or the mutation coverage.

It should be noted that the method 100 may be implemented utilizing various systems, hardware, software, applications, user interfaces, etc., as dictated by the implementer. For example, the system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
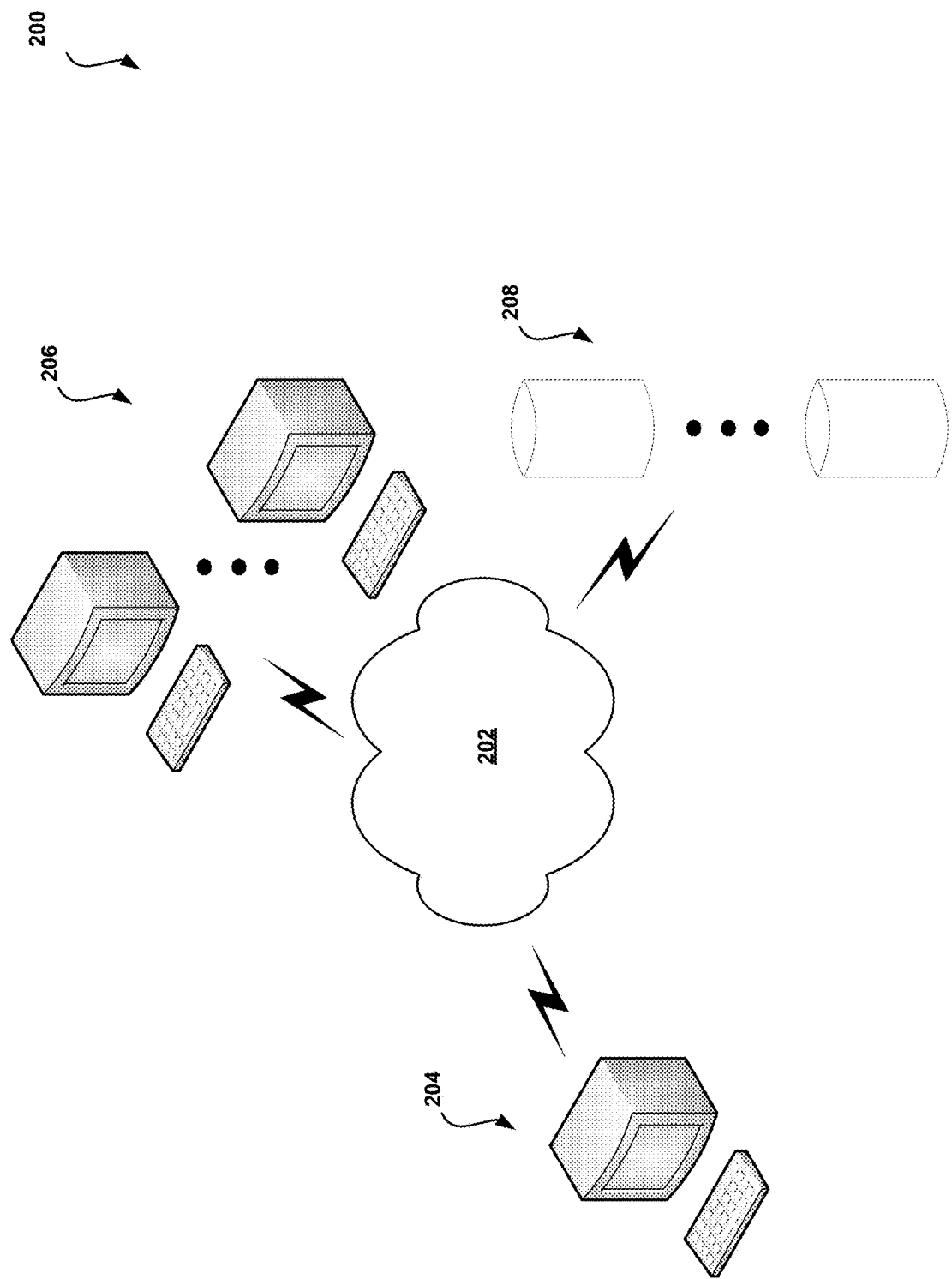
FIG. 2 shows a system for determining incremental code coverage of a software project, in accordance with one embodiment.

FIG. 2 shows a system 200 for determining incremental code coverage of a software project, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a system 204, which may implement a variety of applications or software, etc. The system 204 may be capable of communicating with a plurality of systems 206, either directly or over one or more networks 202, for determining incremental code coverage of a software project. The system 204 may also be in communication with one or more repositories/databases 208.

The system 204 functions to determine incremental code coverage and/or incremental mutation coverage for individual software projects or teams within a common working environment.

In computer software, code coverage refers to a measure used to describe the degree to which the source code of a program is tested by a particular test suite. A program with high code coverage is thoroughly tested and has a lower chance of containing the software bugs than a program with low code coverage. The most important aspect of code quality maintenance is to test the runtime behavior of application logic on a day to day basis. However, in a typical product development and maintenance environment, new software projects often involve dealing with enormously complex legacy code along with new development.

With the growing demand of updating the existing codes with constantly changing customer requirements and having a need for the frequent releases, determination of incremental code coverage is vital for software development organizations. Incremental code coverage gives information about the code coverage only for the portion of codes that are changed instead of giving information about the code coverage for the entire source code.

One of the conventional incremental code coverage methods provides the incremental coverage maximum at the basic block level, which restricts two project teams from making changes to the same module in multi team environments working on the same module. If one of the teams make changes, it may result in inaccurate incremental code coverage with the conventional code coverage tools. Also, the conventional incremental code coverage tools provide reports in a time bound manner. For example, the incremental code coverage may be calculated for a predefined time tenure, such as over the period of last thirty days. With such tools, teams cannot check all the changes including unit tests and generate full-proof incremental code coverage report as per their needs.

Figure 3:
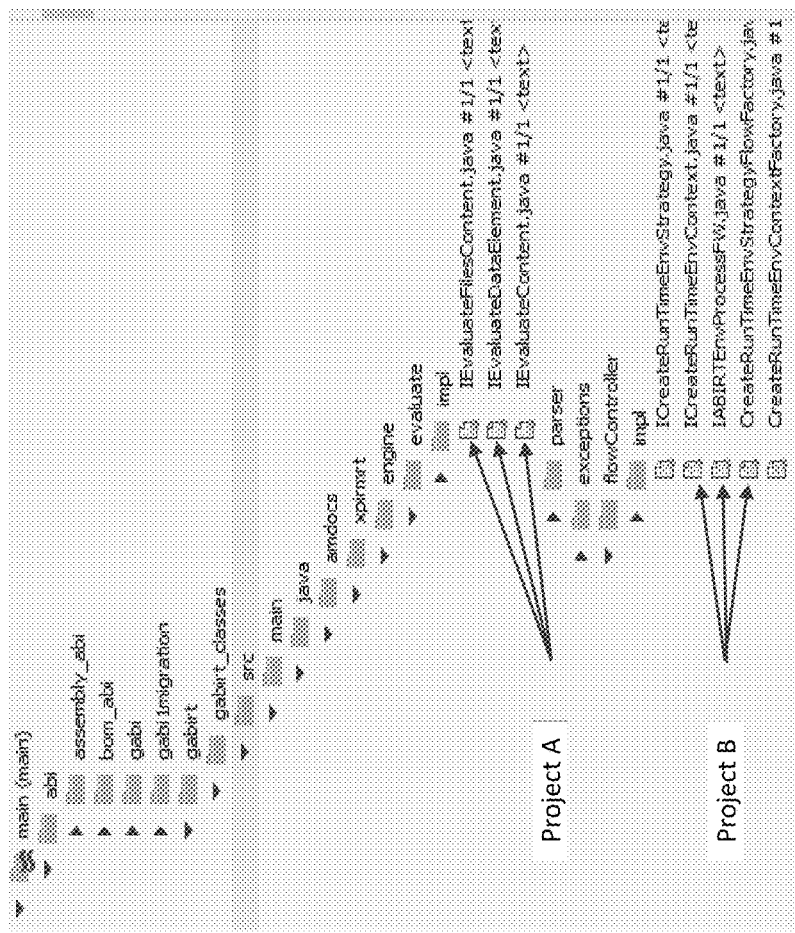
FIG. 3 shows an example of software development with two teams working on separate files.

As one example of a problem statement, in a given scenario of agile software development, one may consider two different teams (e.g., team A and team B) working on two different sets of files but within the same module (e.g. impl), as shown in FIG. 3. A conventional tool will generally provide the incremental coverage at the module level, which means it will provide incremental coverage for the whole module impl as the conventional tool cannot exclude the changes done by other teams on the same module. So with the help of a conventional tool, users can only compute the incremental coverage for the whole module impl but cannot compute the incremental coverage for team A or team B independent of each other.

Figure 4:
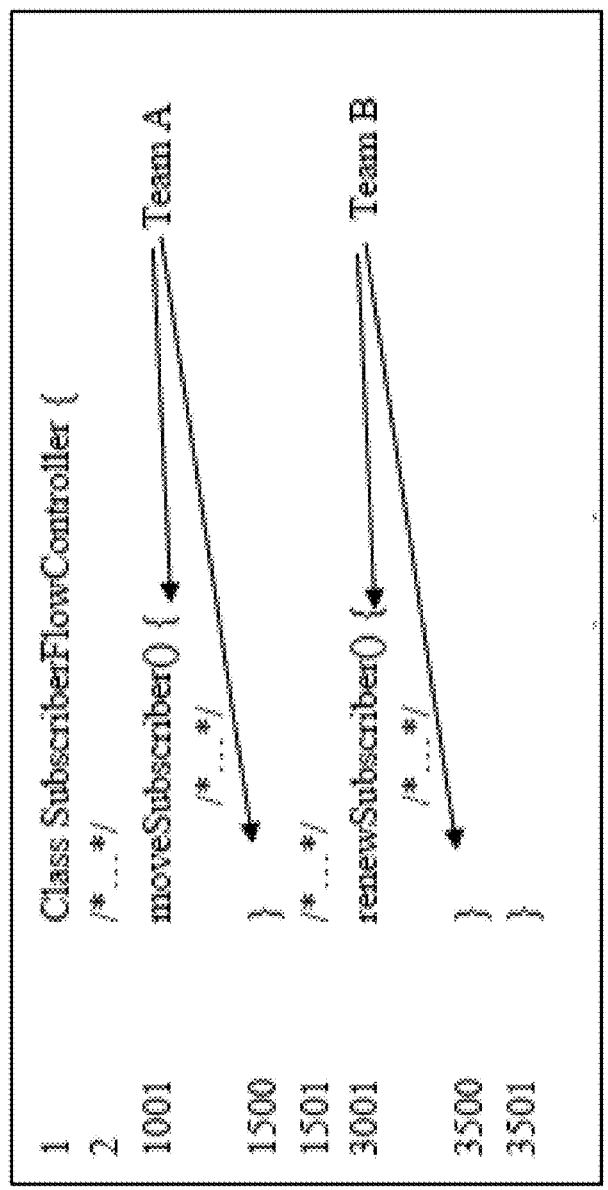
FIG. 4 shows an example of software development with two teams working on separate files.

As another example, there may be a java class SubscriberFlowController, as shown in FIG. 4. The team A while working on project A ensures coverage of lines 1001 to 1500. However, the team B while working on project B does not provide coverage for the lines 3001 to 3500.

In the example of FIG. 4, using the conventional incremental code coverage tools, the incremental code coverage obtained for the class "SubscriberFlowController", will show as 50% percent, because only 500 overall lines (i.e. 1001-1500) of the total 1000 lines (i.e. 1001-1500 and 3001-3500) that are currently being worked upon (or changed) are covered. However, the above data may be misleading and does not provide an accurate picture. For instance, the incremental code coverage for the team A should be 100 percent while none for the team B.

In some other scenarios, unit tests cover part of the actual change and some other existing code. In such cases, 100% percent coverage might be reported, yet when the new changes were not covered completely. Such observation also results in erroneous data on the incremental code coverage. Hence, while writing unit tests with projects that involves dealing with legacy code along with new development, there arises an open challenge to ensure the quality of delta change with the conventional tools. Similarly, the mutation code coverage is not calculated using the existing tools in a project wise manner.

Based on the foregoing, there is a need for mechanisms to compute project specific incremental code coverage and/or incremental mutation coverage. Further, the mechanism should be capable of ensuring the accuracy of results of the incremental code coverage. Moreover, the mechanism should be integrated with existing software development tools or environments to provide convenient and easy to use options to the developers and the testing teams.

The system 204 implements a method to determine project specific incremental code coverage in an operating environment where multiple teams are working on different projects of same module (or in same repository). For instance, there may be a module defined as 'M', which is constantly being changed or getting functionally enriched by sub-projects like P1, P2 . . . Pn, effectively developed by teams T1, T2 . . . Tn, respectively. The system 204 aims implements a single incremental code coverage analyzer (and incremental mutation coverage analyzer) that calculates the incremental code (or mutation) coverage (hereinafter also referred to as "delta coverage") obtained by teams T1, T2 . . . Tn, in a parallel fashion. The present invention is described with examples of computations of the incremental code coverage, and the same teachings, with little modifications, can be applied for computation of the incremental mutation coverage.

Various embodiments of present invention are capable of segregating existing code from the new code that are added or modified as part of a given project. The system 204 evaluates whether the changed part is covered or not in the code coverage and then calculates the incremental code coverage accordingly.

In one embodiment, the system 204 may implement a parallel computing model that analyzes/computes every project and every changelists within the project in a parallel fashion.

Figure 5:
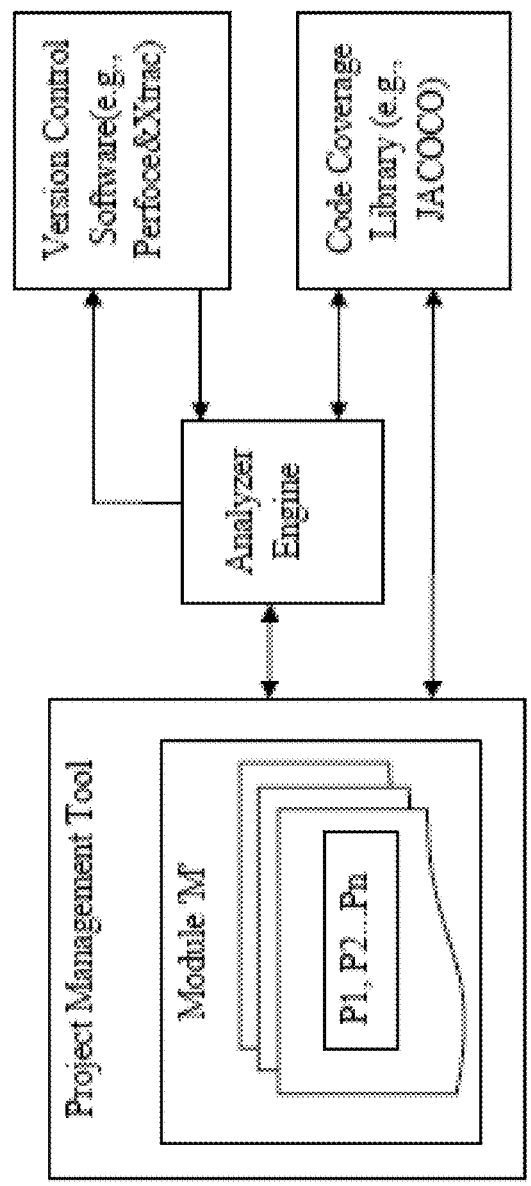
FIG. 5 shows a block diagram of components involved in computation of project specific incremental code coverage, in accordance with one embodiment.

FIG. 5 shows a block diagram 500 of components involved in computation of project specific incremental code coverage, in accordance with one embodiment. As an option, the diagram 500 may be implemented in the context of the details of the previous figures and/or any subsequent figure(s). Of course, however, the diagram 500 may be implemented in the context of any desired environment. Further, the aforementioned definitions may equally apply to the description below.

As shown in FIG. 5, the analyzer engine may be the main component of the system that is responsible for computation of project specific incremental code coverage. The analyzer engine obtains information about the ongoing projects for example project IDs and a changelist for each project. The changelist includes information about the portions that are changed in the existing codes for each project. In an example, the changelist comprises broad level information on specific parts or sub-modules that are currently being changed by respective project teams. For example, the changelist may include a listing of parts of the module that are changed by respective teams T1, T2 . . . Tn. For instance, the changelist CL1 may correspond to team T1, CL2 corresponds to team T2, and so on.

In one embodiment, the analyzer engine may be integrated with the version control software, and the analyzer engine may provide the changelist (CL1, CL2 . . . CLn) to the version control software, such as Perforce. The version control software may then provide the summary of the changelists to the analyzer engine. The summary may include line numbers that are changed, and file names corresponding to the new changes that are made as compared to the previous versions.

The analyzer engine then obtains code coverage data of the overall codebase for module M from existing code coverage libraries, which may be provided in a large xml file. An example of the code coverage libraries includes, but is not limited to, JACOCO. The overall code coverage data obtained from JACOCO may be stored using build automation tools such as Apache Maven.

Now, since, the analyzer engine has the information about the exact changes (e.g., line numbers, file numbers etc., for each project P1, P2 . . . Pn), and the overall code coverage data, the analyzer engine uses both the information to compute the incremental code coverage for each of the projects P1, P2 . . . , Pn.

The same technique may also be used for computation of incremental mutation coverage, wherein the overall mutation coverage is obtained from the open source plug-in 'pitest' (analogous of the overall code coverage obtained from JACOCO for the incremental code coverage).

Figure 6:
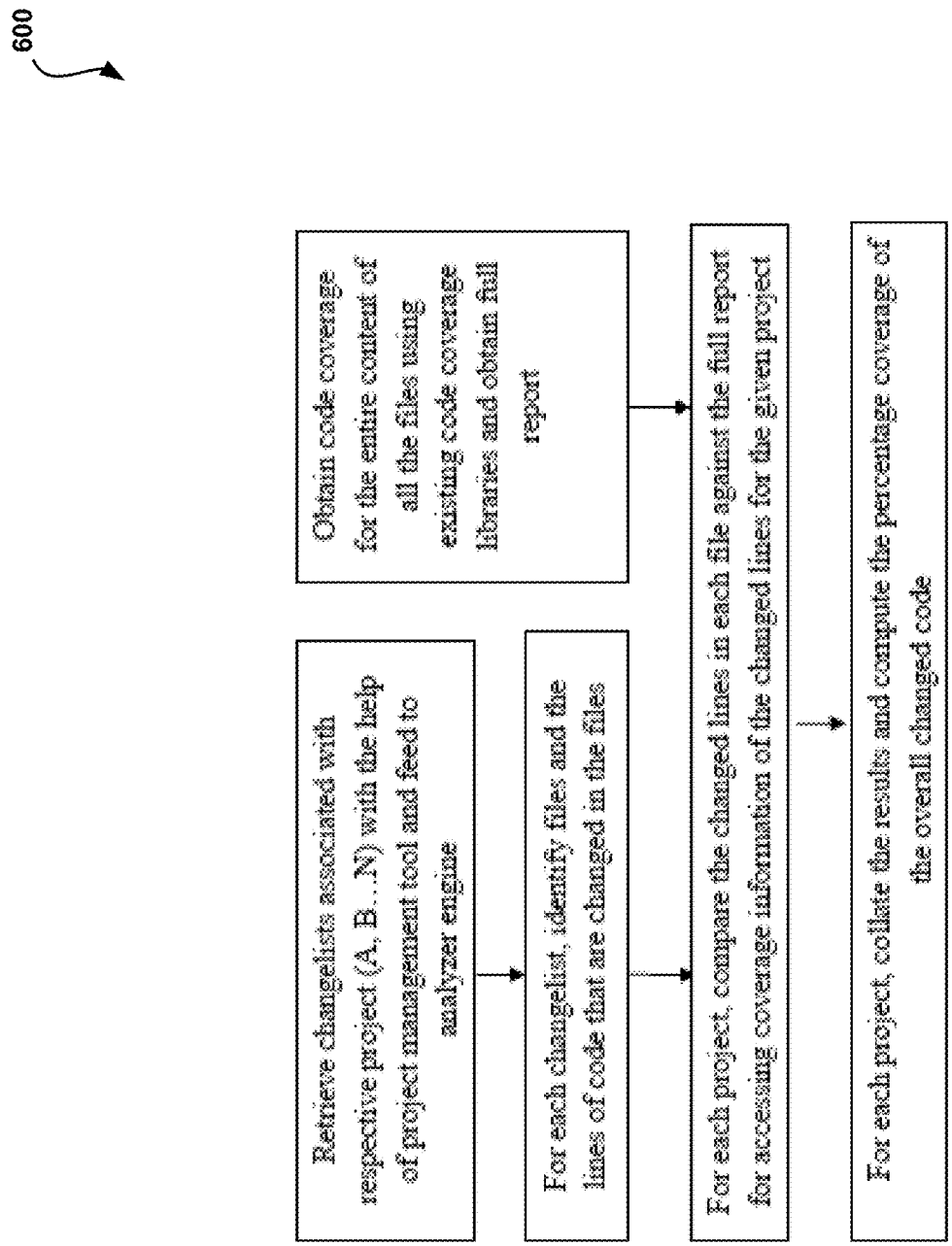
FIG. 6 shows a flow diagram of computation of project specific incremental code coverage, in accordance with one embodiment.

FIG. 6 shows a flow diagram 600 of computation of project specific incremental code coverage, in accordance with one embodiment. As an option, the diagram 600 may be implemented in the context of the details of the previous figures and/or any subsequent figure(s). Of course, however, the diagram 600 may be implemented in the context of any desired environment. Further, the aforementioned definitions may equally apply to the description below.

Figure 7:
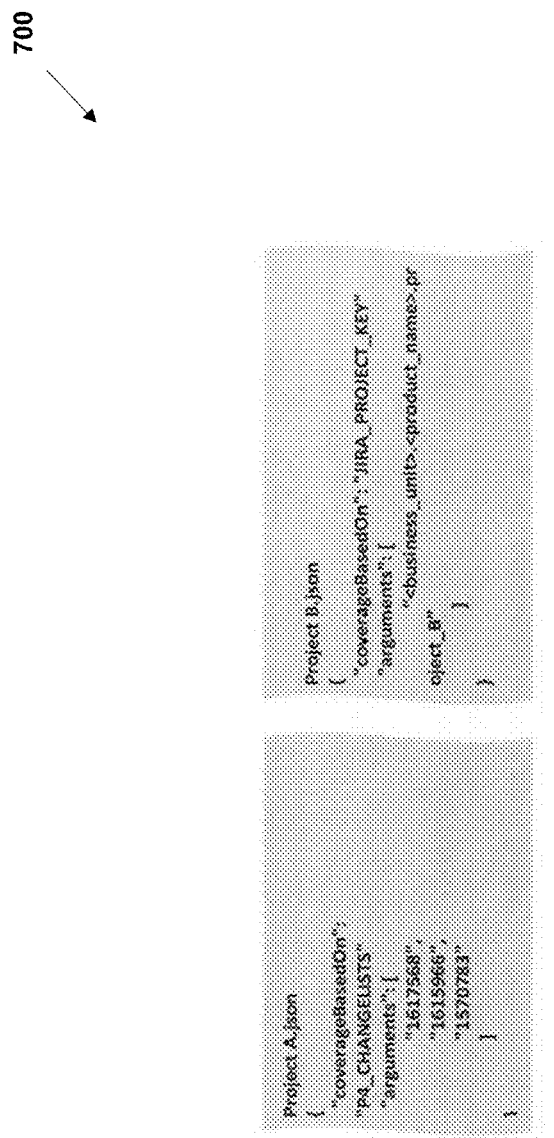
FIG. 7 shows example files that may serve as input to an analyzer engine, in accordance with one embodiment.

In operation, a system retrieves a changelist generated using an analyzer engine. In this case, the job ID or the project key that uniquely identifies the project in the project management tool, such as Atlassian JIRA, is further queried to fetch the changelist created under the system. A list of changelist or the changelist created under the system for each of the projects A, B . . . N are fed into the analyzer engine integrated with the project management tool to retrieve the final changelist associated with the respective projects A, B . . . N. The example files that serve as input to the analyzer engine are shown in FIG. 7. Here, the changelists for the project A are directly obtained from project file, and changelists for the project B are indirectly obtained via project key from project management tool Atlassian JIRA. Changelists numbers serves as the input to the version control unit. However, to avoid manual tracking of changelists numbers the project key may also be defined in the project file. The system described herein will take care of integration with the project management tool to retrieve the changelists numbers associated with the given project.

Figure 8:
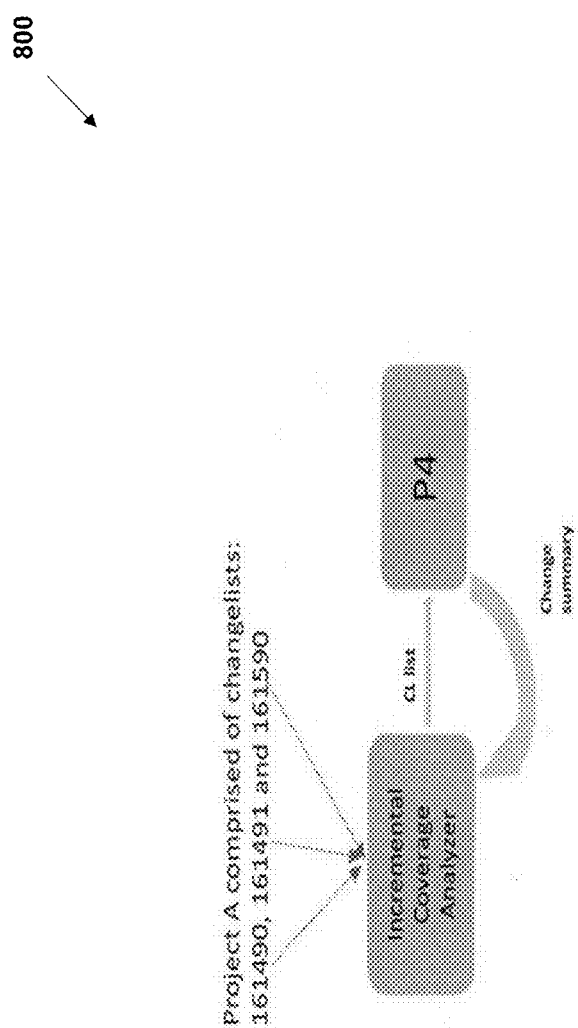
FIG. 8 shows a simplified representation of data exchange between an analyzer engine and version control software, in accordance with one embodiment.

The system then performs an identification of a changed line with respect to changed code. In this case, the incremental code coverage analyzer engine is integrated with the version control software, such as Peforce or Xtrac. The analyzer engine with the help of the version control software determines the files that are changed in a project A from their respective changelist. In one embodiment, the files are then compared with the immediate previous versions of the respective files to identify the lines that are changed in the files of the project A with respect to the obtained changelist. A change summary, which includes the line numbers and file names corresponding to the newly added changes in the project A, is provided to the analyzer engine. For instance, as shown in FIG. 8, the changelists' number 161490, 161491 and 161590 are provided by the analyzer engine (see, 'incremental coverage analyzer' in FIG. 8) to the Perforce tool (see, P4 in FIG. 8). The P4 tool provides the complete summary details of the exact changes in each line of each file to the analyzer engine. This is shown as "change summary" in FIG. 8. FIG. 8 shows a simplified representation of data exchange between an analyzer engine and version control software, in accordance with one embodiment.

Figure 9:
FIG. 9 shows a snapshot of an xml file obtained from JACOCO, in accordance with one embodiment.

The system then obtains code coverage and a full report for all the projects. The code coverage for the entire content of all the files of all projects A, B . . . N is calculated using the existing code coverage libraries, such as JACOCO. The libraries provide results in a very large xml file. The xml file contains the instruction level instrumentation results for each line of a source file of a particular project and lists out exactly how many numbers of instructions at those lines were covered by unit tests for that particular project. The build automation tools, such as Apache Maven, are used to store the reports as an artifact item in the build repository for later retrieval. A snapshot of an xml file is shown below in FIG. 9, which includes coverage information for each line of the code. Here the 'nr' corresponds to the row line number, 'mi' corresponds to the instructions that are missed and 'ci' corresponds to the instructions that are covered in computing coverage.

The system then assesses coverage information of changed lines in each project. In this step, the analyzer engine will compare the changed lines for each project A, B . . . N with the full artifact report prepared for their respective project using the code coverage libraries to assess the coverage information of the changed lines in each project.

Figure 10:
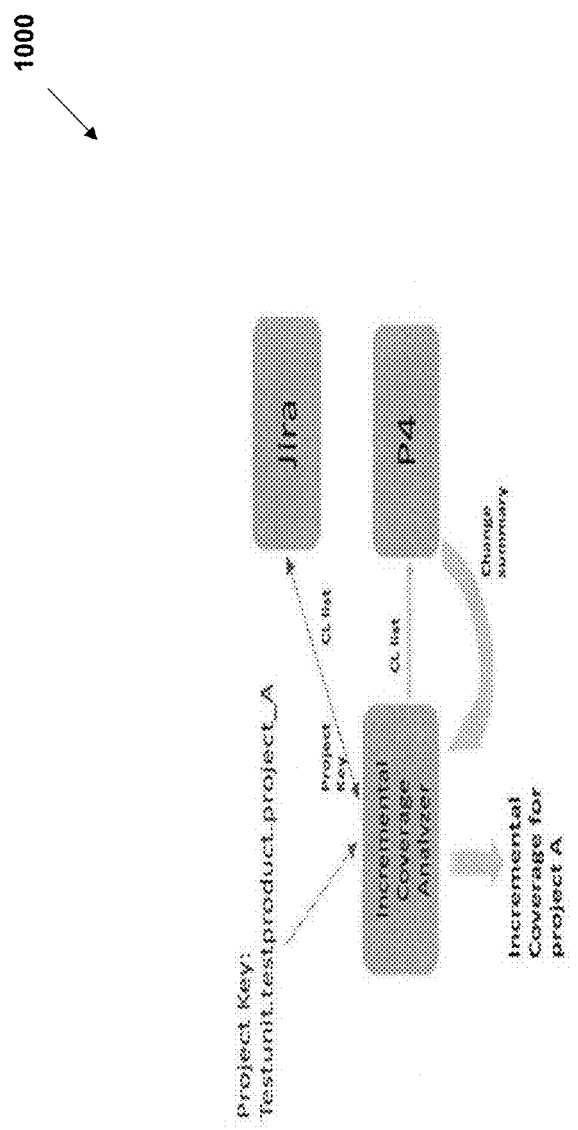
FIG. 10 shows a simplified representation of determination of incremental code coverage for a project A, in accordance with one embodiment.

The system then calculates incremental code coverage for each project. The results of the coverage information assessment of the changes lines for each project A, B . . . N, are collated to compute the percentage of the code coverage for that particular project. The code coverage percentage will be the incremental code coverage for that project, as shown in FIG. 10. FIG. 10 shows a simplified representation of determination of incremental code coverage for the project A.

Figure 11:
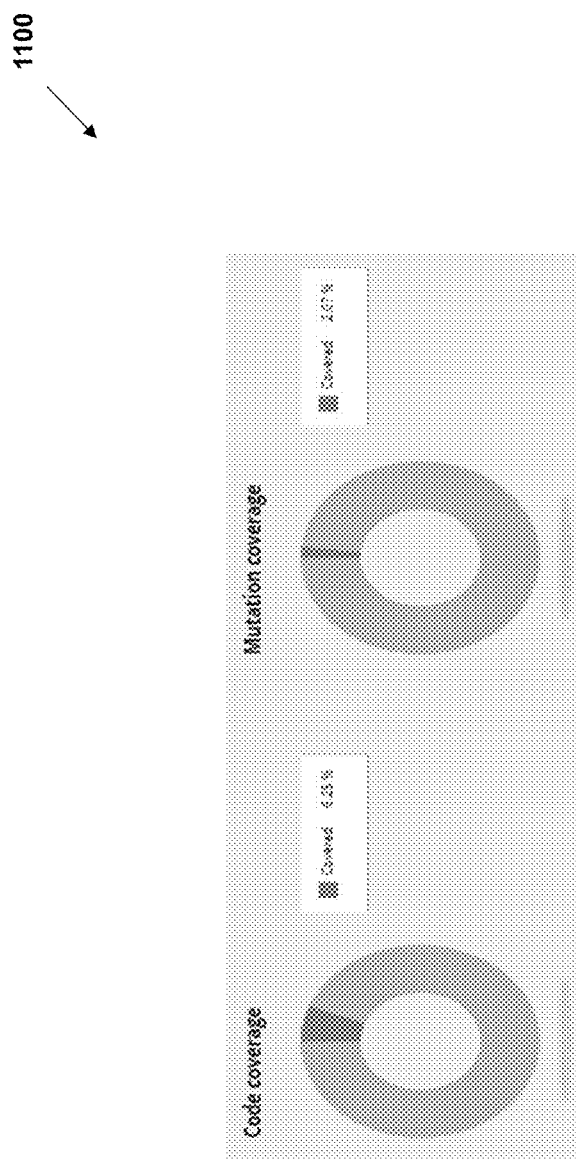
FIG. 11 shows experimental results/performance data using conventional techniques.

FIG. 11 shows experimental results/performance data using conventional techniques. The results 1100 show the overall code and mutation coverage for module 'M'.

As shown, the code coverage for the whole module M is found to be 6.25% and the mutation coverage for the same module is found to be 2.07% using conventional tools. On the other hand, when the system computed incremental code coverage and incremental mutation coverage using the method described herein for a project T1' on the same module, it was found to be 96.43% and 63.87% as shown in FIG. 12.

Figure 12:
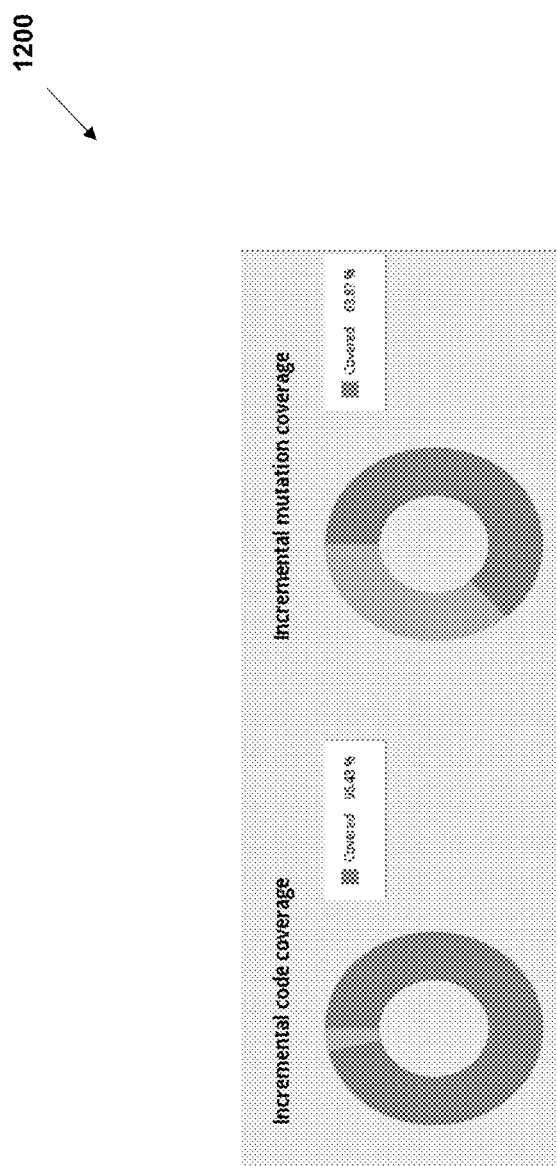
FIG. 12 shows experimental results/performance data, in accordance with one embodiment.

FIG. 12 shows experimental results/performance data, in accordance with one embodiment. The results 1200 show incremental code and mutation coverage for project T1' on module 1\4'.

In various embodiments, there may be scenarios in which the files might have been modified by many other changelists which are not part of the given project. Thus, the system may implement a sub process that aligns line indexes of the identified changes after processing all the changelists.

Table 1 shows one example.

TABLE 1

| File ABC (CL 1) | File ABC (CL 2) | File ABC (CL 3) |
|---|---|---|
| line 1: a | line 1: a | line 1: a |
| line 2: b | line 2: x | line 2: x |
| line 3: c | line 3: b | line 3: y |
|  | line 4: c | line 4: b |
|  |  | line 5: c |

For the example shown in Table 1, Project A is comprised of CL1 and CL3, while CL2 belongs to another project B. While processing CL #1, the system identified line 1, 2 and 3 were new as this was the first revision. Note that changes done w.r.t CL #2 were not related to current project. Now again while processing CL #3, the system compared the third version of the file with an immediate previous version and identified line 3 was the only change.

Thus by the conventional process of comparing differences across a set of versions of the file the system ends up with total identified changes as line 1,2,3 only by both CLs, which is not correct. Actually, the lines that were changed are 'a', 'b', 'c' by CL1 and 'y' by CL3, line x was not a part of our project.

The sub-process compares all identified changed lines per CL with the head revision of the file so that the system can identify that between head (last revision) and first revision there were 2 lines added right before the line no. 2 ('b') in the first revision.

The system aligns all the identified lines for CL 1 which are greater than 2 by the offset value which is also 2. The final list of changed lines after the sub-process completion will be: CL1: 1, 4, 5; and CL3: 3.

Also, the UT execution data (the full fledge line coverage data which is not delta coverage) obtained is also based on the head revision of the file, thus aligning line numbers irrespective of the project participation is useful to ensure the accuracy of the process.

There is one more validation step required along with the align line index process to validate that for every changed line the change existed in the final revision. If not, the system removes the change from the final result.

Figure 13:
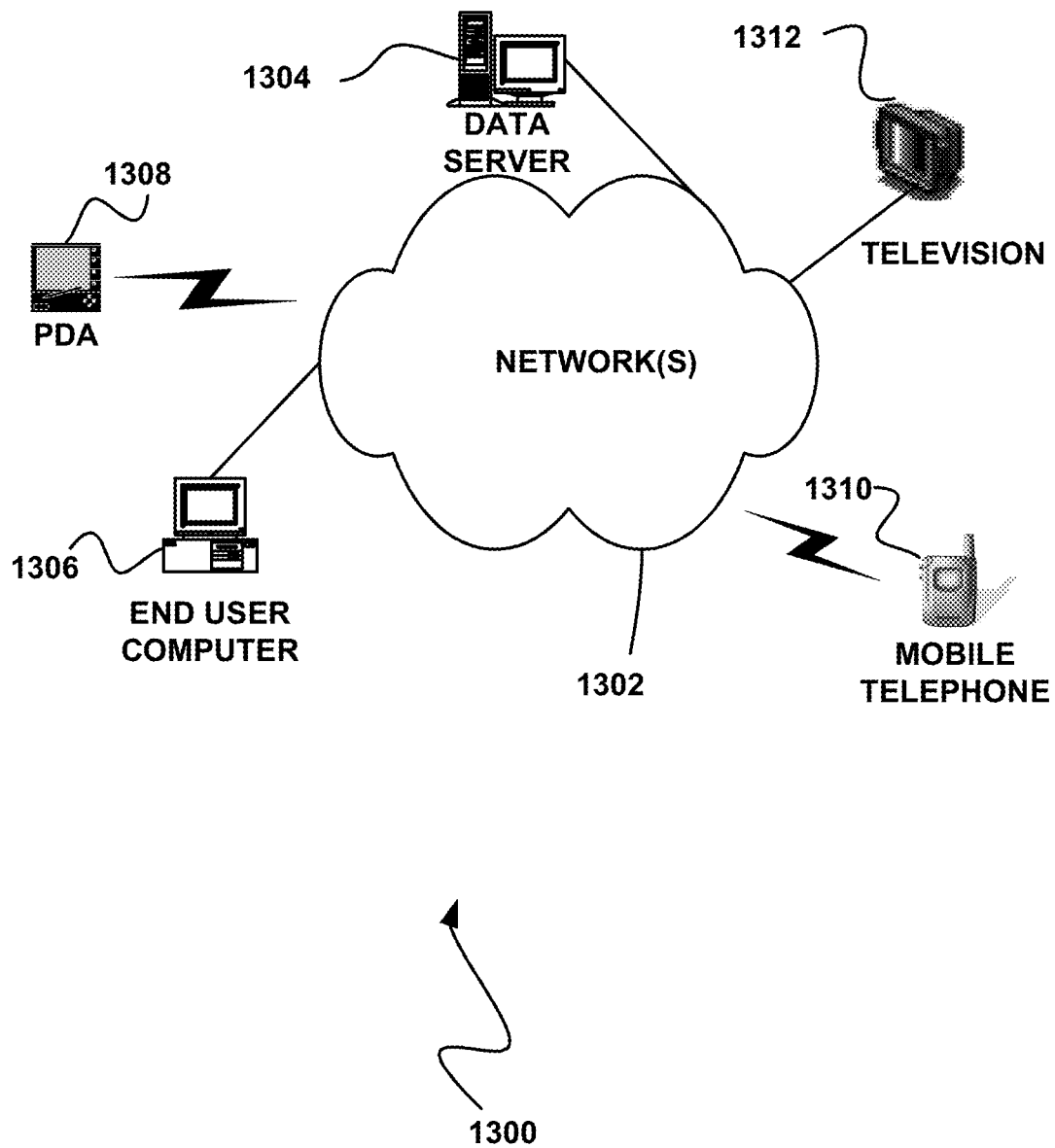
FIG. 13 illustrates a network architecture, in accordance with one possible embodiment.

FIG. 13 illustrates a network architecture 1300, in accordance with one possible embodiment. As shown, at least one network 1302 is provided. In the context of the present network architecture 1300, the network 1302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1302 may be provided.

Coupled to the network 1302 is a plurality of devices. For example, a server computer 1304 and an end user computer 1306 may be coupled to the network 1302 for communication purposes. Such end user computer 1306 may include a desktop computer, lap-top computer, and/or any other type of logic. Still yet, various other devices may be coupled to the network 1302 including a personal digital assistant (PDA) device 1308, a mobile phone device 1310, a television 1312, etc.

Figure 14:
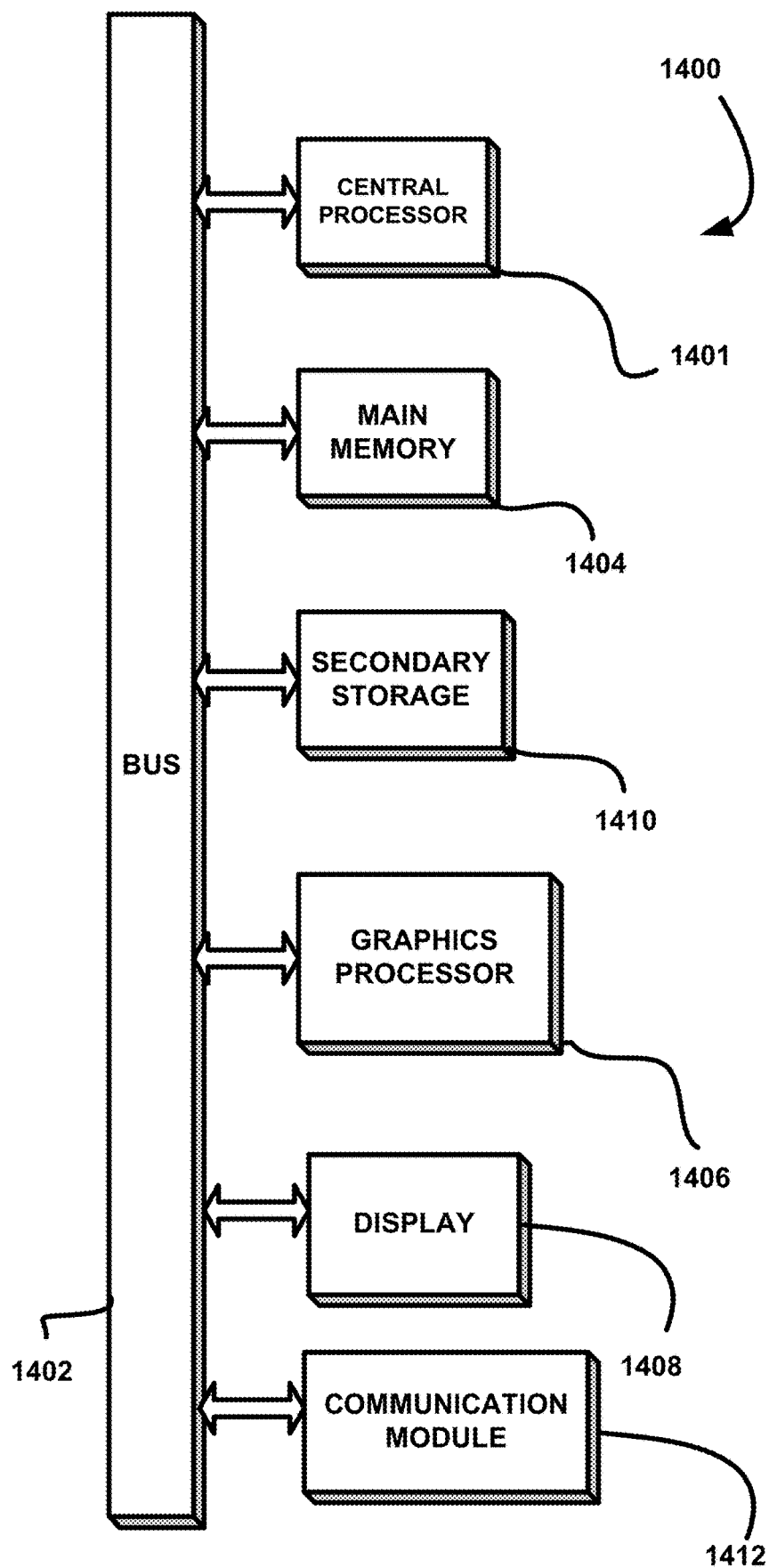
FIG. 14 illustrates an exemplary system, in accordance with one embodiment.

FIG. 14 illustrates an exemplary system 1400, in accordance with one embodiment. As an option, the system 1400 may be implemented in the context of any of the devices of the network architecture 1300 of FIG. 13. Of course, the system 1400 may be implemented in any desired environment.

As shown, a system 1400 is provided including at least one central processor 1401 which is connected to a communication bus 1402. The system 1400 also includes main memory 1404 [e.g. random access memory (RAM), etc.]. The system 1400 also includes a graphics processor 1406 and a display 1408.

The system 1400 may also include a secondary storage 1410. The secondary storage 1410 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 1404, the secondary storage 1410, and/or any other memory, for that matter. Such computer programs, when executed, enable the system 1400 to perform various functions (as set forth above, for example). Memory 1404, storage 1410 and/or any other storage are possible examples of non-transitory computer-readable media.

The system 1400 may also include one or more communication modules 1412. The communication module 1412 may be operable to facilitate communication between the system 1400 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:
1. A method, comprising:
retrieving, by a system, a plurality of changelists associated with a plurality of software projects operating on a same source code of a program, wherein each changelist of the plurality of changelists indicates portions of the source code of the program that are changed by a corresponding software project of the plurality of software projects;
identifying, by the system, one or more changed lines with respect to changed code within the program, utilizing the plurality of changelists, including for each changelist of each corresponding software project:
  determining, from the changelist, one or more files associated with the program that are changed by the software project, and
  comparing each file of the one or more files to an immediate previous version of the file to identify lines of code within the one or more files that are changed by the software project;
obtaining, by the system, overall test coverage for the entire program in association with all of the plurality of software projects, by determining for each line of each file of each software project which instructions at the line are covered by unit tests for the software project;
assessing, by the system, test coverage for the one or more changed lines in each software project of the plurality of software projects, from the overall test coverage obtained for the entire program;
calculating, by the system independently for each software project of the plurality of software projects, incremental test coverage for the lines of code changed by the software project by:
  collating the overall test coverage obtained for the entire program by software project to compute a percentage of test coverage for each software project of the plurality of software projects; and
reporting, by the system, the incremental test coverage calculated for each software project of the plurality of software projects.

2. The method of claim 1, wherein the plurality of software projects are associated with a same module of the program but different software teams.

3. The method of claim 2, wherein the incremental code coverage is calculated for each of the plurality of software projects such that the incremental code coverage is separately provided for each of the different software teams.

4. A non-transitory computer readable medium storing computer code executable by a processor to perform a method comprising:
  retrieving, by a system, a plurality of changelists associated with a plurality of software projects operating on a same source code of a program, wherein each changelist of the plurality of changelists indicates portions of the source code of the program that are changed by a corresponding software project of the plurality of software projects;
  identifying, by the system, one or more changed lines with respect to changed code within the program, utilizing the plurality of changelists, including for each changelist of each corresponding software project:
    determining, from the changelist, one or more files associated with the program that are changed by the software project, and
    comparing each file of the one or more files to an immediate previous version of the file to identify lines of code within the one or more files that are changed by the software project;
  obtaining, by the system, overall test coverage for the entire program in association with all of the plurality of software projects, by determining for each line of each file of each software project which instructions at the line are covered by unit tests for the software project;
  assessing, by the system, test coverage for the one or more changed lines in each software project of the plurality of software projects, from the overall test coverage obtained for the entire program;
  calculating, by the system independently for each software project of the plurality of software projects, incremental test coverage for the lines of code changed by the software project by:
    collating the overall test coverage obtained for the entire program by software project to compute a percentage of test coverage for each software project of the plurality of software projects; and
  reporting, by the system, the incremental test coverage calculated for each software project of the plurality of software projects.

5. The non-transitory computer readable medium of claim 4, wherein the plurality of software projects are associated with a same module of the program but different software teams.

6. The non-transitory computer readable medium of claim 5, wherein the incremental code coverage is calculated for each of the plurality of software projects such that the incremental code coverage is separately provided for each of the different software teams.

7. A system, comprising:
  a non-transitory memory storing instructions; and
  one or more processors in communication with the non-transitory memory that execute the instructions to perform a method comprising:
    retrieving a plurality of changelists associated with a plurality of software projects operating on a same source code of a program, wherein each changelist of the plurality of changelists indicates portions of the source code of the program that are changed by a corresponding software project of the plurality of software projects;
    identifying one or more changed lines with respect to changed code within the program, utilizing the plurality of changelists, including for each changelist of each corresponding software project:
      determining, from the changelist, one or more files associated with the program that are changed by the software project, and
      comparing each file of the one or more files to an immediate previous version of the file to identify lines of code within the one or more files that are changed by the software project;
    obtaining overall test coverage for the entire program in association with all of the plurality of software projects, by determining for each line of each file of each software project which instructions at the line are covered by unit tests for the software project;
    assessing test coverage for the one or more changed lines in each software project of the plurality of software projects, from the overall test coverage obtained for the entire program;
    calculating, independently for each software project of the plurality of software projects, incremental test coverage for the lines of code changed by the software project by:
      collating the overall test coverage obtained for the entire program by software project to compute a percentage of test coverage for each software project of the plurality of software projects; and
    reporting, by the system, the incremental test coverage calculated for each software project of the plurality of software projects.

* * * * *